(12) United States Patent
Cubias

(10) Patent No.: US 9,173,257 B2
(45) Date of Patent: Oct. 27, 2015

(54) LOW VOLTAGE LED DIMMER WITH INTEGRATED UNIVERSAL SWITCH MODE POWER SUPPLY

(76) Inventor: Victor M. Cubias, Joppa, MD (US)

(*) Notice: Subject to any disclaimer, the term of this patent is extended or adjusted under 35 U.S.C. 154(b) by 409 days.

(21) Appl. No.: 13/105,769

(22) Filed: May 11, 2011

(65) Prior Publication Data
US 2012/0062133 A1 Mar. 15, 2012

Related U.S. Application Data

(60) Provisional application No. 61/333,694, filed on May 11, 2010.

(51) Int. Cl.
*H05B 37/02* (2006.01)
*H05B 33/08* (2006.01)

(52) U.S. Cl.
CPC .......... *H05B 33/0809* (2013.01); *H05B 33/086* (2013.01); *H05B 37/0245* (2013.01)

(58) Field of Classification Search
CPC .......... H05B 33/0815; H05B 33/0818; H05B 33/0803; H05B 37/029; H05B 37/0281; Y02B 20/208; Y02B 20/42
USPC ........ 315/246, 223–224, 291, 106–107, 116, 315/151, 158, 272, 277, 279, 280, 281, 294, 315/307, 312, 318, 360, 247
See application file for complete search history.

(56) References Cited

U.S. PATENT DOCUMENTS

| | | | |
|---|---|---|---|
| 7,863,828 B2 * | 1/2011 | Melanson | 315/247 |
| 7,891,853 B2 * | 2/2011 | Park | 362/611 |
| 8,049,427 B2 * | 11/2011 | Altonen et al. | 315/129 |
| 8,075,149 B2 * | 12/2011 | Ko et al. | 362/95 |
| 8,324,823 B2 * | 12/2012 | Choi et al. | 315/244 |
| 8,330,388 B2 * | 12/2012 | Kuo et al. | 315/291 |
| 8,393,747 B2 * | 3/2013 | Kevelos et al. | 362/95 |

* cited by examiner

*Primary Examiner* — Haissa Philogene
(74) *Attorney, Agent, or Firm* — J. Andrew McKinney, Jr.; McKinney & Associates, LLC

(57) ABSTRACT

A low voltage dimmer for LED lamps incorporates an AC-DC power supply along with a Pulse Width Modulator (PWM) to modify the power delivered to an LED load is configured to fit inside the form factor of a standard single gang electrical to control the intensity of the light emitted by the LED. The PWM portion of the dimmer circuit incorporates a microprocessor configured to produce a train of output pulses and controlled by a variable input voltage to modulate the output duty cycle of these pulses to drive one or more LED lamps to switch between "on" and "off" conditions. Variation of the duty cycle of the pulses regulates the total amount of time in each cycle that the lamp is illuminated, with the aggregate "on" time determining the apparent brightness of the lamp.

8 Claims, 17 Drawing Sheets

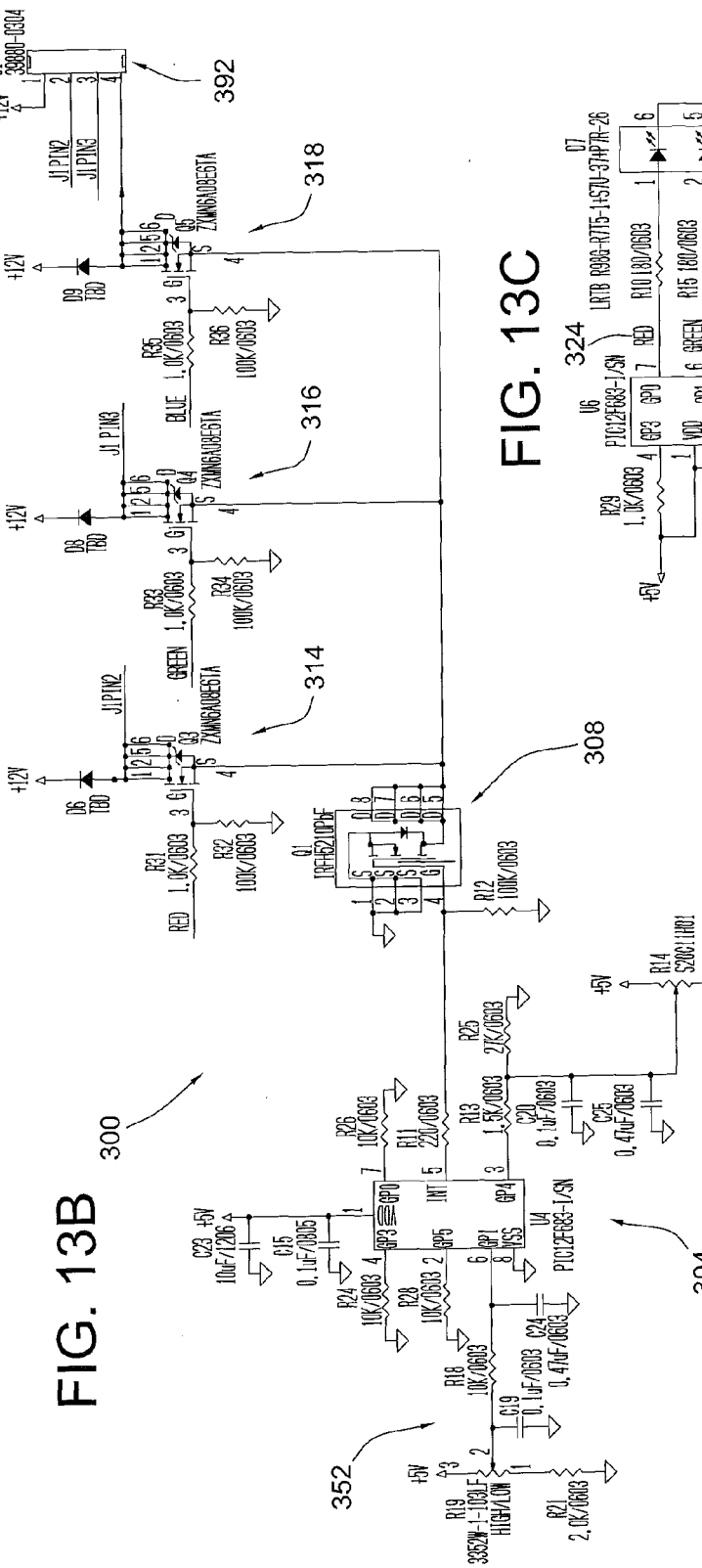
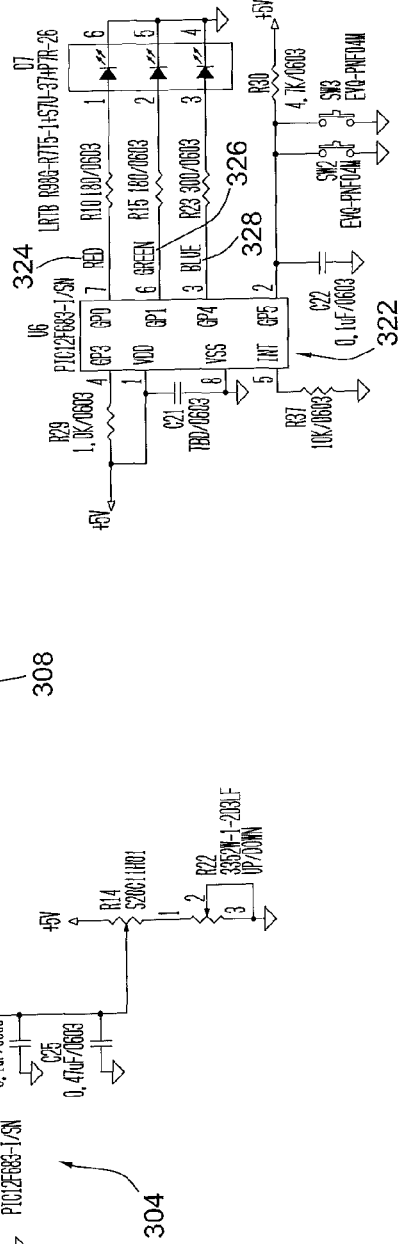
FIG. 13B
FIG. 13C

PCB Assembly
Rear View

PCB Assembly
Front View

LOW VOLTAGE LED DIMMER WITH INTEGRATED UNIVERSAL SWITCH MODE POWER SUPPLY

This application claims the benefit of U.S. Provisional Application No. 61/333,694, filed May 11, 2010, the disclosure of which is hereby incorporated herein by reference.

BACKGROUND OF THE INVENTION

1. Field of the Invention

The present invention relates, in general, to control circuits for Light Emitting Diode (LED) illumination devices, and more particularly to an economical, low-voltage dimmer control configured for use in a standard electrical box of the type typically used, for example, in residential lighting installations, for controlling the brightness of LED lamps.

2. Discussion of the Prior Art

Traditionally, LED illumination devices have been used as low power indication devices and for low power electronic displays, principally because they were small and long-lasting, and because they used very small amounts of power as compared to incandescent bulbs, neon tubes or other light sources. As materials science and semiconductor fabricating technologies progressed, it became feasible to manufacture LEDs that would generate an increased amount of light per device (i.e., having greater luminous intensity, or brightness) in a wider variety of colors, with the result that LED lighting has recently found applications in a variety of new areas. Since LEDs more efficiently convert electrical energy into visible light and because the energy usually wasted as heat is much lower for LEDs than for most other sources of light, LED lights are between 5 and 10 times more efficient than incandescent lights, and about 2 to 3 times more efficient than fluorescent lights.

Recently, it has become economically feasible to make relatively high output LEDs which render a pleasing white light, and these newer LEDs have been incorporated into automotive and traffic signaling lamps, handheld flashlights and a variety of other products. In addition, LED lamps have become viable for use in residential and other illumination fixtures, and they can now be obtained in a configuration having a standard Edison-style base for use, for example, in an ordinary lamp socket configured for standard incandescent bulbs.

The particular characteristic of the LED which remains unchanged by these recent developments, however, is that, being a solid-state Diode, it typically has only two states; namely, "on" or "off." Therefore, users seeking to adjust the illumination from an LED lamp were confounded by this characteristic, and those who wanted a light that could be controlled with a standard "dimmer" were frustrated, because the common technique for dimming incandescent bulbs by lowering the supply voltage, when applied to an LED lamp typically would only turn the lamp from "on" to "off".

Standard dimmers are readily available to consumers for use in "single-gang" electrical boxes, where they are often installed instead of a standard single-throw light switch in residential and commercial lighting applications. The space in that single gang box is limited, however, since it is about 1.50" wide, 2.25" long and 1.25" high, and there is no way, at present, to provide a dimming control at suitable power levels for driving LED lamps, where the dimming control circuitry will fit in such a tight spot, for prior approaches were cumbersome and expensive.

Some of the newer LEDs can be powered directly from a 120V supply line, but these tend to be expensive and many of them cannot be dimmed, and when used in ambiance lighting, they have the tendency to be too bright. LEDs using lower voltage levels are more economical, but the circuitry used to switch or modulate a voltage signal has typically required too much power, generated too much heat and taken up too much space to be useful for anyone but a technician who has the space and budget to assemble the power supply and pulse width modulating or switching components needed to generate a useable dimming signal. There is a need, therefore, for an economical and easy to use low voltage LED dimmer controller for overcoming these problems, and providing an economical and convenient-to-install structure which can work in typical residential lighting installations.

OBJECTS AND SUMMARY OF THE INVENTION

Accordingly, it is an object of the present invention to overcome the above mentioned difficulties by providing an economical and easy to install LED Dimmer with an Integrated Power Supply and for use with low voltage LED lamps, wherein all the elements needed to control and dim low voltage LEDs are integrated into a standard single-gang electrical receptacle structure, regardless of the size or power level of the dimmer. Another object of the invention is to provide such an LED dimmer that can also be incorporated into a bigger unit, and that can utilize power factor controlling circuitry, more power, and/or remote control using RF, IR, DMX or some other communications protocol or technology. Still another object is to provide a dimmer that is specifically designed for LEDs or other low voltage loads where everything is integrated into one simple to use and to connect device.

In accordance with the present invention, a simple to use dimming control is provided for use with low voltage LED Lighting, wherein its structure, circuitry and the method of assembly provide an integrated solution to the problems identified above. The dimmer control of the present invention is configured to fit within a conventional single-gang electrical receptacle, or dimmer box, and in one embodiment comprises a power supply, an On/Off switch, and a solid-state microcontroller integrated into a package configured to control available low voltage LED lights. This invention simplifies the installation and application of LED dimming control structure and circuitry in both new and existing construction by integrating all the components required to dim the LEDs into one easily-mounted, compact package. The compactness available with the present structure is partly due to the configuration of the power supply, which generates over 40 W for driving the low voltage LED lamps but does not need external cooling because it is over 80% efficient.

Briefly, the dimmer of the present invention incorporates a PWM and controller block that consists of one microchip micro-controller and one MOSFET for a single color LED dimmer, and two microchip micro-controllers and four MOSFETs for a RGB LED dimmer. This block converts a DC voltage into a modulated signal that controls the intensity and/or mode of the LED load. In one embodiment, the dimmer utilizes pulse width modulation, while in another embodiment the LED Dimmer is able to dim almost any type of LED load by varying the frequency of the PWM, for example from 1 kHz up to 15 kHz using 6 discrete frequencies. Alternatively the system provides a continuously variable PWM frequency from 1 kHz up to 15 kHz and a selectable duty cycle. In accordance with one aspect of the present invention, then, a low voltage dimmer for LED lamps incorporates an AC-DC power supply along with a Pulse Width Modulator (PWM) or current control circuit to modify the power delivered to the LED load, configured to fit inside the form factor of a standard single, or if desired, a dual, gang electrical receptacle, or dimmer housing, to thereby control the intensity of the light emitted by the LED. In an exemplary embodiment, the PWM portion of the dimmer circuit incorporates one or more micro-controllers utilizing, for example, suitable sensing circuits, one or more microprocessors and memory, plus output circuitry, which for convenience will be hereinafter referred to as a microprocessor. The microprocessor is configured to produce a train of output pulses and is controlled by a variable input voltage to modulate the output duty cycle of these pulses to drive one or more LED lamps to switch between "on" and "off" conditions. Variation of the duty cycle of the pulses regulates the total amount of time in each cycle that the lamp is illuminated, with the aggregate "on" time determining the apparent brightness of the lamp. Alternatively, this could be done using analog electronics.

In one exemplary prototype, a PIC microprocessor was configured and programmed to generate selected PWM pulses in response to a user's control input. The LED lamp's apparent intensity was controlled by a user selectively adjusting a control input, such as a variable resistor, that set an analog control voltage that was supplied to the microprocessor controller, which sensed the control input voltage, determined the corresponding PWM duty cycle, and generated a corresponding PWM output signal at the desired duty cycle. The PWM signal was then transmitted to the LED load, turning on the LED to illuminate it during the application of the pulse, and allowing it to go off during the "off" portion of the duty cycle. This on-off cycling of the LED regulated the amount of light emitted over a period of time and thus controlled the apparent intensity, or the illumination, provided by the LED. In the illustrated embodiment of the invention, the frequency and amplitude of the PWM pulse is constant while the width of the pulse is modulated in accordance with the controller input, but If desired, a variable frequency pulse can be used to regulate the brightness or dimness of the LED lamp. Having the ability to change either the frequency or the width of the output pulses produced by the PWM enables this dimmer to dim most of the low voltage LEDs currently in the market; for example, it even allows the dimmer of the present invention to dim LEDs that have a built-in DC-DC converter, which is normally intended to produce a constant light output when powered by a specified voltage range.

The dimmer control circuit of the present invention can be set up to provide two, three or more separate and distinct output patterns for a given control input to drive multiple loads. For example, an LED lamp assembly may have at least one Red LED, at least one Blue LED and at least one Green LED (to provide an RGB LED lamp), and this lamp can be controlled to generate a desired blended RGB light output by generating distinct R, G and B output PWM signal patterns adapted for use with the corresponding RGB LED lamp. The dimmer may also incorporate a low limit control (e.g., setting the minimum drive level selectively between zero and 20% of the maximum LED illumination drive signal as a lower limit for dimming), in case a given LED lamp load has flickering issues at low intensity or the user wants to set a minimum low level, the dimmer will still maintain the full range control over the entire travel of the controller potentiometer.

The dimmer circuit controller can be configured for operation by a slidable or rotatable manually variable resistor, by a touch-controlled keypad, may be configured to respond to a remote control device using wireless or Infrared (IR) control signals with one- or two-way (duplex) communication between the dimmer control circuit and the remote control, or by any other conventional control device. The controller may also incorporate one or more push-button switches for selecting different sequences for an RGB LED lamp. The system of the present invention can include a main hardwired dimmer controller and an optional wireless remote control unit, each of which can be configured with one or more display elements (e.g., LEDs) to indicate the status and/or the output light intensity level of the LED lamps being controlled. In addition, the dimmer may incorporate automatic load-type sensing based on the detected load current to provide over-current or thermal protection.

The dimmer controller preferably includes a switch mode power supply ("SMPS") to maximize efficiency and minimize the space required. Switch mode power supplies provide high efficiency, run cooler, and so are better suited for use in an enclosed single gang box than conventional linear power supplies. Also, the output circuit of the present invention is electrically isolated, so the dimmer controller of the present invention may be used for outdoor lighting.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, and wherein:

FIGS. 13A, 13B and 13C are schematic diagrams illustrating another embodiment of the RGB illumination color selecting LED integrated dimmer control circuit, in accordance with the present invention.

DESCRIPTION OF THE PREFERRED EMBODIMENT

Figure 1:
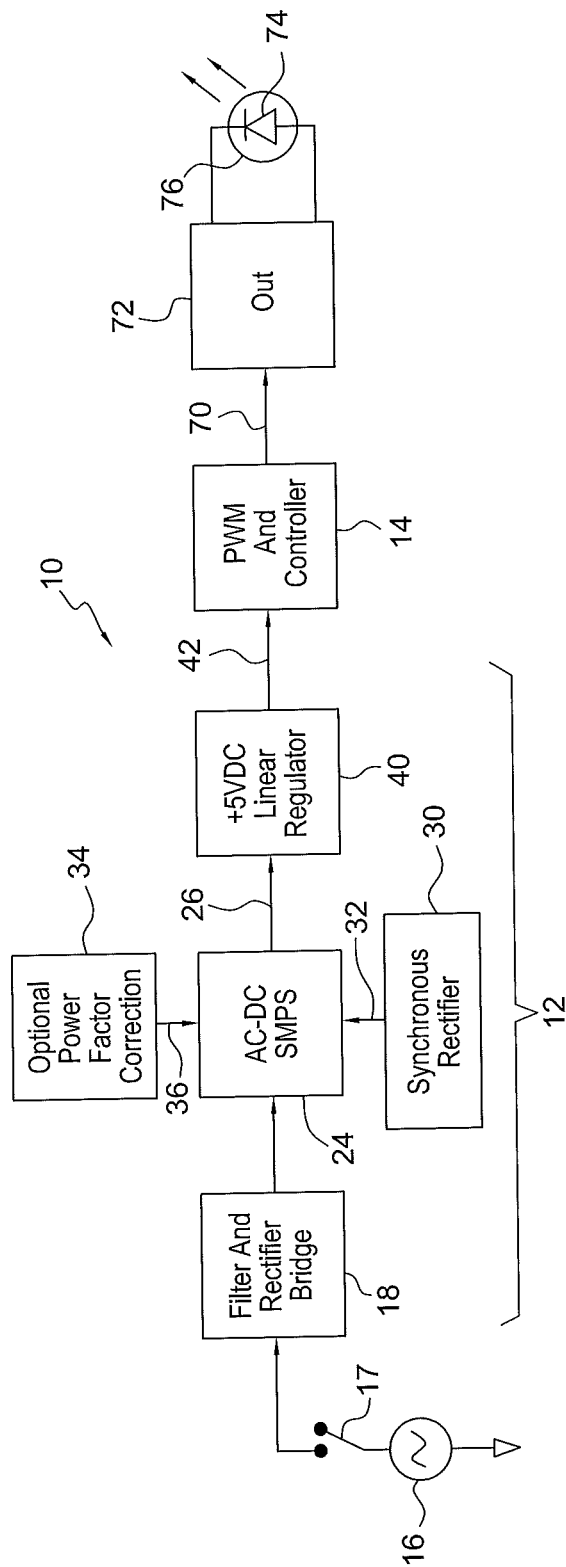
FIG. 1 is a block diagram of an integrated dimmer control circuit for a single color or monochrome low voltage LED lamp system.
Figure 2:
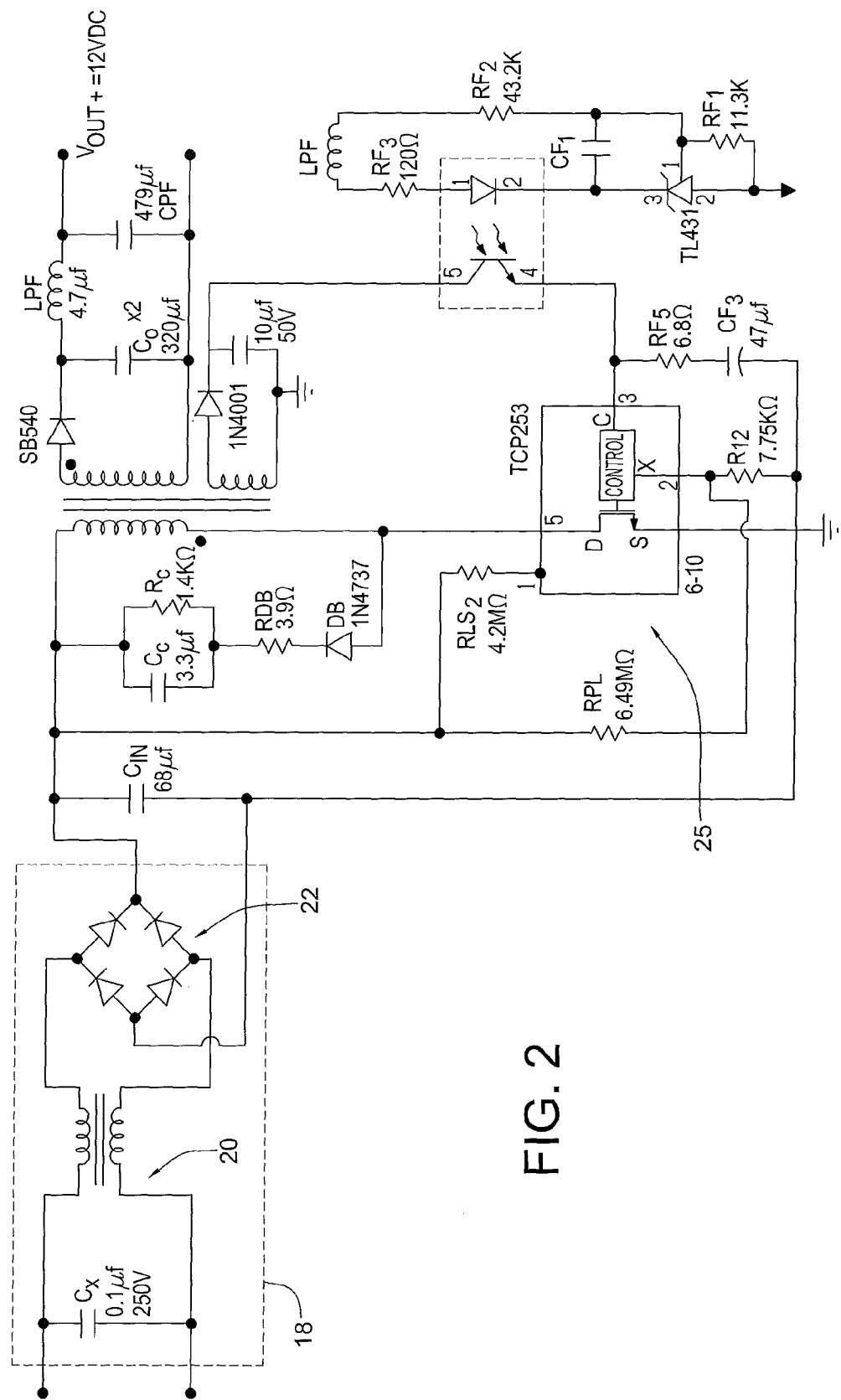
FIG. 2 is a circuit diagram of an embodiment of the invention as illustrated in the block diagram of FIG. 1.

Turning now to FIGS. 1-16B, an exemplary embodiment of a low voltage LED dimmer controller 10 in accordance with the present invention is illustrated in FIGS. 1 and 2 as including two main components: a power supply 12 and a Pulse Width Modulation (PWM) microprocessor and controller 14. Direct current (DC) power is generated from an AC source 16, such as a conventional 120V residential electrical service, which is connected through an on-off switch 17 to a conventional bridge rectifier and filter circuit 18 (FIG. 2) incorporating an LC filter 20 and a diode bridge rectifier 22.

The output from circuit 18 is supplied to an AC-DC Switch Mode Power Supply (SMPS) 24 which converts the AC input supplied to circuit 18 to a lower voltage, rectified, filtered and galvanically isolated DC voltage on its output line 26. For this purpose, a SMPS controller 24 utilizing a single power controller Integrated Circuit ("IC") 25 of the type manufactured by Power Integrations, Inc. was selected. In one implementation of the invention, an isolated flyback converter was used instead of using a simple Transformer and Diode/Bridge Rectifier and Capacitor to rectify the output. Synchronous rectification was used at the output mainly because of increased efficiency and reliability, especially when space is limited, where PCB or Heatsink cooling is limited as in the present case. However, other integrated circuit components may be utilized for this purpose. Synchronous Rectification was achieved using a MOSFET Controller and a MOSFET, because of circuit simplicity. Applicants are using the ZXGD3101N8 MOSFET Controller, however, there are many other options that could be used, including using discrete components.

In accordance with the invention, then, rectification and filtering of the input AC voltage is further enhanced by the use of a synchronous rectification sub-assembly 30 connected to the SMPS controller 24 by way of line 32. Such a circuit may be used with the SMPS using a single power controller (e.g., 25) instead of using a SMPS circuit having two power controllers, since the synchronous rectifier circuit greatly reduces heat dissipation and improves the efficiency of the dimmer circuitry. It was found that at when operated at a power output of 40 watts, the heat dissipation at the output of the SMPS was reduced by about 90% by the synchronous rectifier, although at the cost of some increase in circuit complexity. If desired, and if space is available in the particular application contemplated for the dimmer, a power factor correction circuit 34 may be connected to the SMPS controller by way of line 36.

Figure 4:
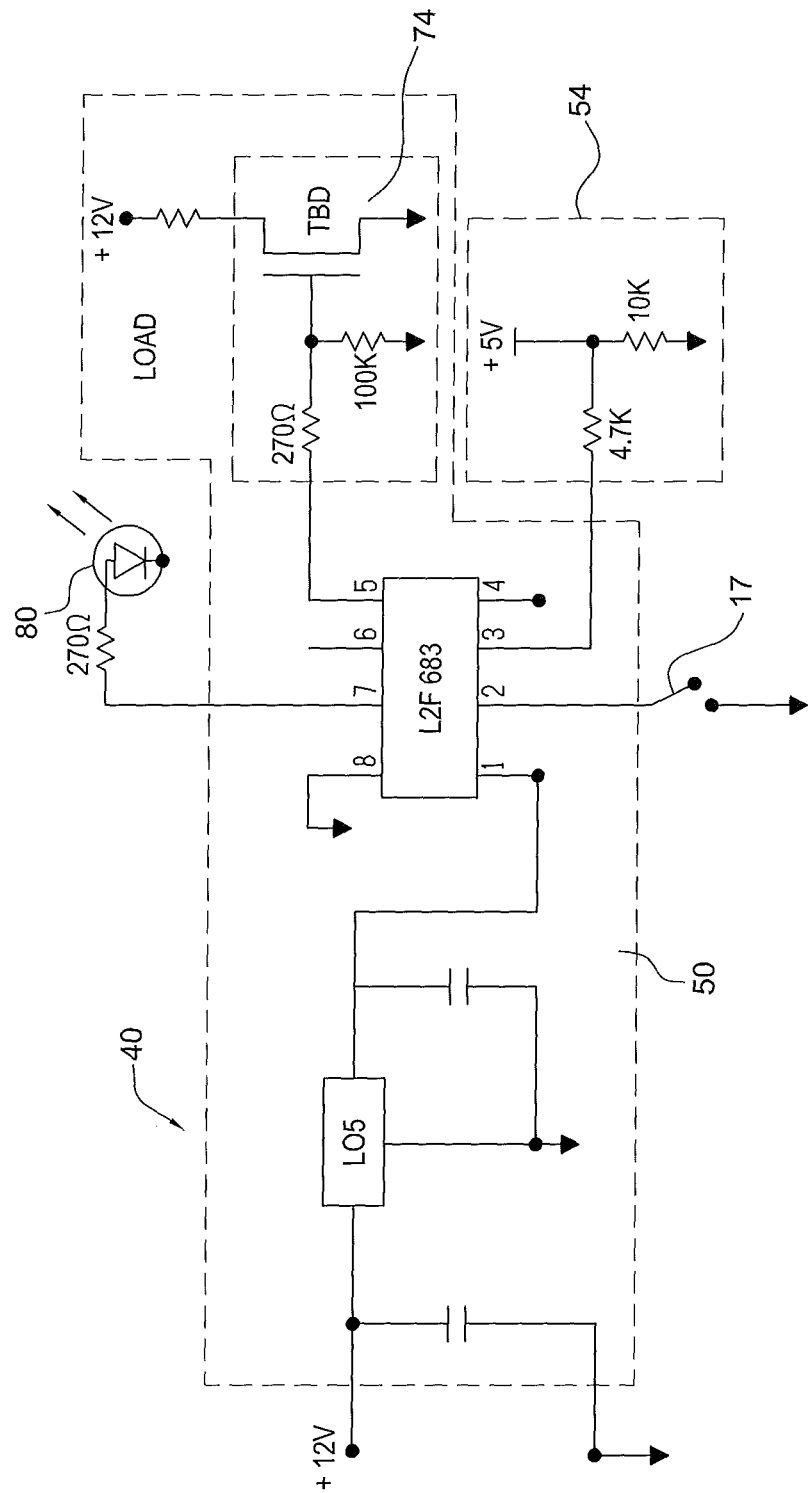
FIG. 4 is a schematic circuit diagram for the integrated dimmer control circuit and corresponding to the block diagram of FIG. 3.

The output from the SMPS 24 is supplied by way of line 26 to a +5V DC linear regulator 40, which is part of a simple filtering circuit incorporating filtering capacitors (as shown in FIG. 4). Although this arrangement is somewhat inefficient, the energy lost due to the very small currents at 5V is negligible.

The filtered voltage from regulator 40 is supplied by way of line 42 to the second part of the dimmer which, as discussed above, is the Pulse Width Modulator and Controller 14. As illustrated in the block diagram of FIG. 3 and the corresponding circuit schematic diagram of FIG. 4, the PWM and Controller 14 consists of a micro-controller device incorporating a microprocessor 50 (for example, a PIC12F683 micro controller) configured and programmed (e.g., as shown in the program flow diagram of FIG. 10) to controllably generate PWM pulses of a selected duty cycle, or frequency modulated pulses in an alternative embodiment, in response to a user's control input. The microprocessor has an input line 52 connected to a controller 54 which, in this example, consists of a potentiometer or variable resistor 56 such as may be found in a conventional light dimmer having, for example, a manually operable slide or rotary control, connected across the DC voltage from regulator 40.

Figure 5:
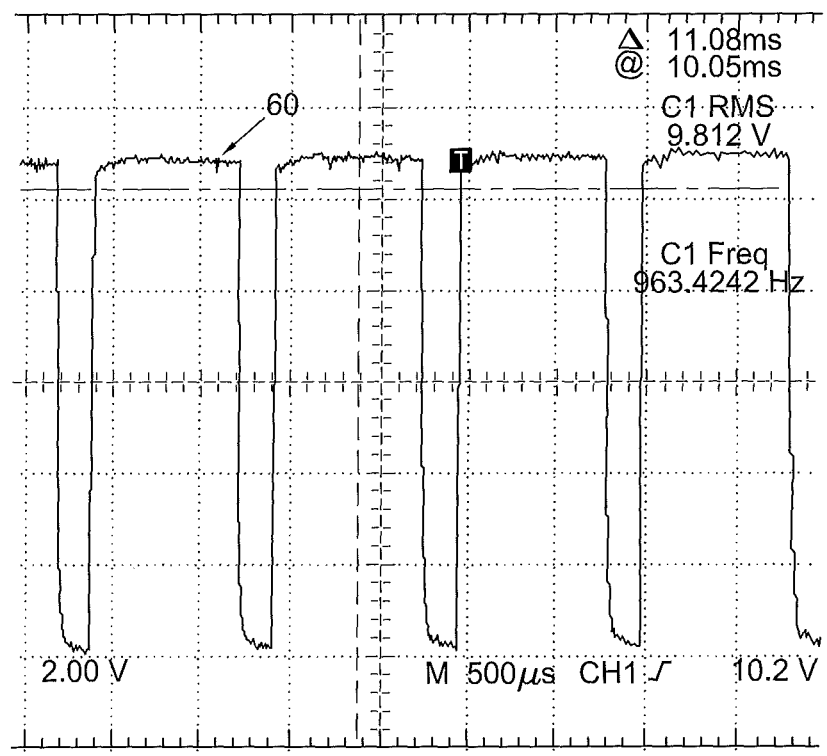
FIG. 5 is a graphical illustration of a first output signal having a first pulse width (corresponding to a duty cycle of about 20%) from a controllable PWM circuit.
Figure 6:
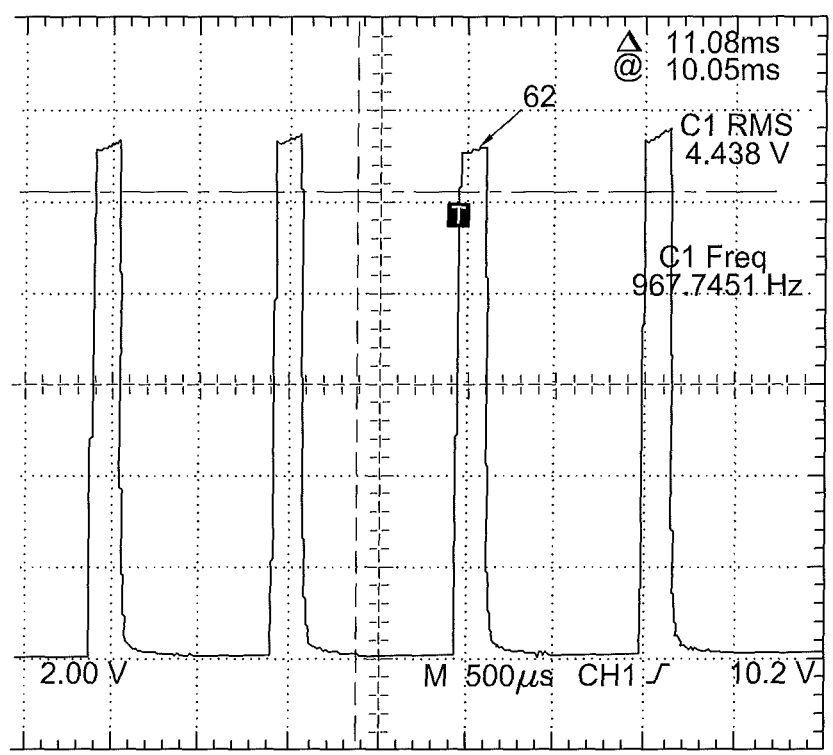
FIG. 6 is a graphical illustration of a second output signal having a second pulse width (corresponding to a duty cycle of about 80%) from the controllable PWM circuit.

The PWM controller 14 senses and responds to the output voltage provided by input control 54 to produce a corresponding pulse width modulated power output signal, such as that illustrated by curve 60 in FIG. 5 for a first selected control PWM voltage waveform, or that of curve 62 in FIG. 6 for a second selected control PWM voltage waveform, which illustrate the changing voltage on PWM controller output line 70. These output pulses on line 70 activate a lamp driver switch 72, which may be a solid state MOSFET transistor device 74, with the switch controlling the application of power by way of line 76 to a single color or mono-chrome (e.g., white) LED lamp 78 mounted, for example, in a lamp receptacle 80.

FIGS. 5 and 6 illustrate traces from an oscilloscope, showing the change in the width of the dimmer circuit PWM output in response to a user's input via controller 54. FIG. 5 shows a trace for a dimmer circuit output having an "on" time (with an "on" voltage of about 12V) which is relatively short in duration as compared its "off" time (with a voltage of about 0.2V), and so corresponds to a rather "dim," or reduced luminous intensity, setting for an LED lamp or solid state lamp array connected thereto.

FIG. 6 shows that same dimmer circuit's output pulse width, when adjusted differently, so that the "on" time (with an "on" voltage of about 12V) is relatively long in duration as compared to its "off" time (with a voltage of about 2V), so that the output signal illustrated in FIG. 6 corresponds to a rather "bright," or increased luminous intensity setting for an LED lamp connected thereto. It will be appreciated by those of skill in the art that the trace shown in FIG. 6 corresponds to a PWM signal which is more nearly "always on", where the voltage remains fixed at the "on" voltage level, for the brightest output from a connected LED lamp or lamp array.

The PWM microprocessor 50 thus may be programmed (e.g., using a program with steps illustrated as in FIG. 10) to respond to the amplitude of the input control signal on line 52 to generate a train of output pulses having fixed amplitudes and selected durations, or widths, over a given period of time, or cycle. The widths of the pulses determine the "on" time of the switch 72, and thus of the lamp 78 in a given cycle, while the spaces between the pulses determine the "off" time of the lamp during that cycle, the ratio of "on" time to "off" time in a cycle being referred to as the duty cycle of the pulse power output. Accordingly, the LED lamp's intensity is controlled when a user selectively adjusts the control input, as by varying the value of resistor 56, and, in response, the microprocessor senses the control input and determines the corresponding PWM duty cycle. The microprocessor then generates the PWM output signal at the desired duty cycle, whereupon the output signal is transmitted to the LED load. By varying the output pulse widths, the lamp "on" and "off" times are correspondingly varied and the overall intensity, or apparent brightness, of the lamp is determined.

In another implementation of the invention, the PWM microprocessor may be programmed to regulate the duty cycle of the output power pulses by varying the frequency of fixed-width pulses, so that brightness is controlled by the number of times a fixed-width power pulse is supplied in a given cycle, rather than by varying or modulating the width or duration of a fixed number of pulses in a cycle. Furthermore, it will be understood that the PWM can be implemented by using discrete analog electronics, using Op-Amps and electronic timers such as an LM555 timer integrated circuit (not shown).

Although the intensity control adjustment is illustrated and described above as a manually operated user control variable resistor 56, it can also be configured as a touch-controlled keypad, or it can be a remotely operable controller which may communicate with the dimmer by way of an infra-red (IR) communication device. Any conventional controller that will provide a selectively variable control voltage or other signal may be used to operate the integrated dimmer control circuit.

Figure 7:
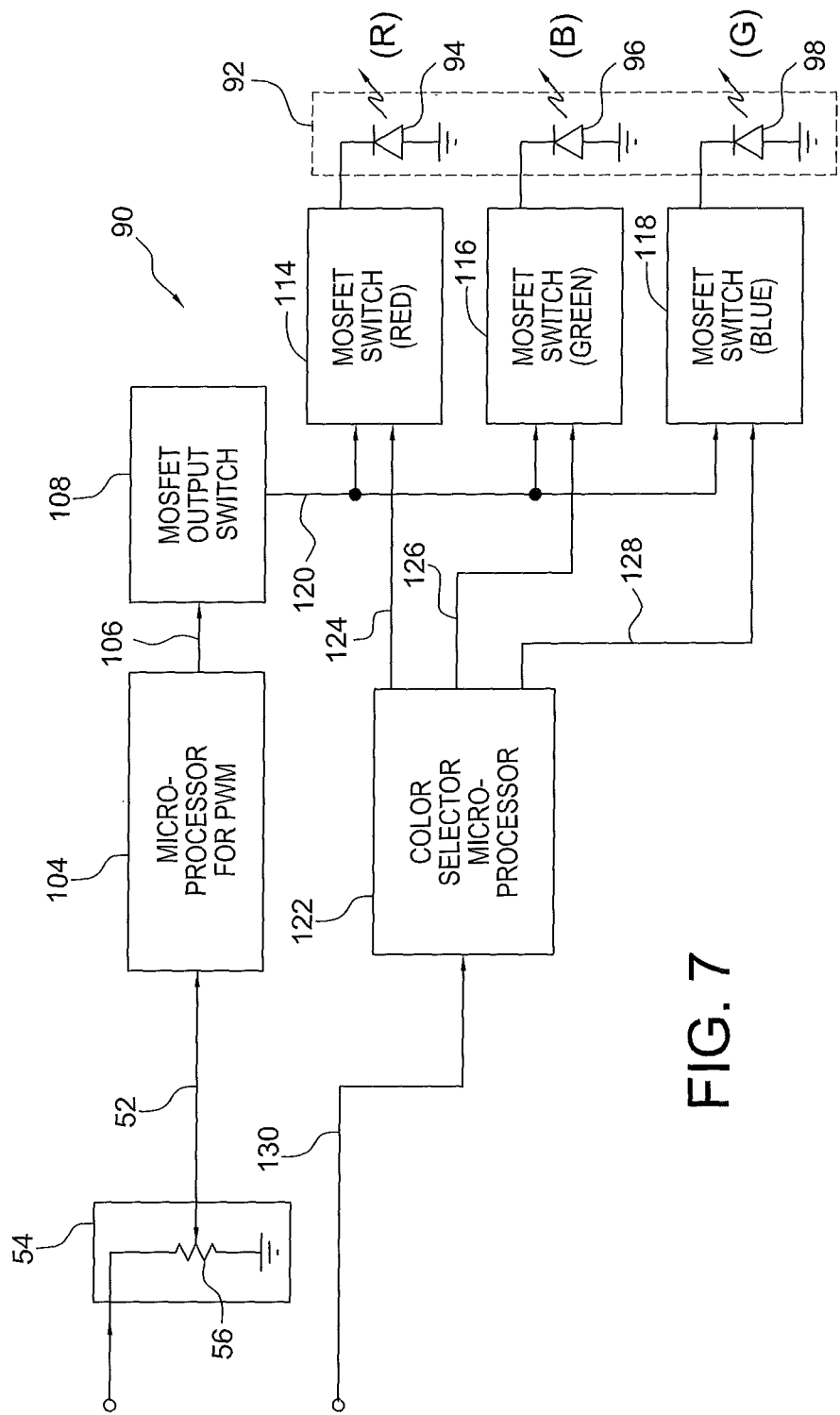
FIG. 7 is a block diagram of a modified version of the integrated dimmer control of the invention, for selectively controlling individual colors in a multicolor (RGB) LED lamp.

As illustrated in the integrated dimmer control circuit embodiment of FIG. 7, the dimmer control circuit can be configured as a multi-output dimmer to provide two, three or more distinct output signals controlled by a single variable control input. In this embodiment, the multi-output dimmer 90 controls the intensity of, for example, an LED lamp assembly 92 having at least one Red LED 94, at least one Blue LED 96 and at least one Green LED 98 to provide an RGB LED lamp that can be dimmed by the common controller 54, illustrated as the variable resistor 56. As discussed above with respect to the dimmer of FIG. 3, the output voltage from controller 54 is supplied via line 52 to a pulse width modulator microprocessor 104, the output of which is a width-modulated pulsed signal on line 106 which is supplied to a MOSFET switch 108 to switch the light assembly 92 on and off to control its brightness. In this case, however, the lamps 94, 96 and 98 are individually controlled by corresponding lamp switches 114, 116, and 118, each driven by the output on line 120 from switch 108.

The individual lamp switches 114, 116, and 118, each require two inputs to energize their corresponding lamps, so each lamp switch is further controlled by a second input provided by a second, color selector, microprocessor 122 by way of red, green and blue control signals on lines 124, 126, and 128, respectively. Microprocessor 122 is programmed (e.g., as shown in the RGB program flow chart of FIG. 11) to respond to an input signal on line 130 and produce output signals patterned to select, or enable, which of the multiple lamps will be activated by the PWM output from microprocessor 104. Accordingly, the outputs from the two microprocessors 104 and 122 cooperate to control the brightness of the light produced by each LED in the lamp assembly 92 (connected via connector J1, as shown in FIG. 8) that is enabled to thereby generate a desired blended RGB light output by generating distinct R, G and B outputs.

Figure 8:
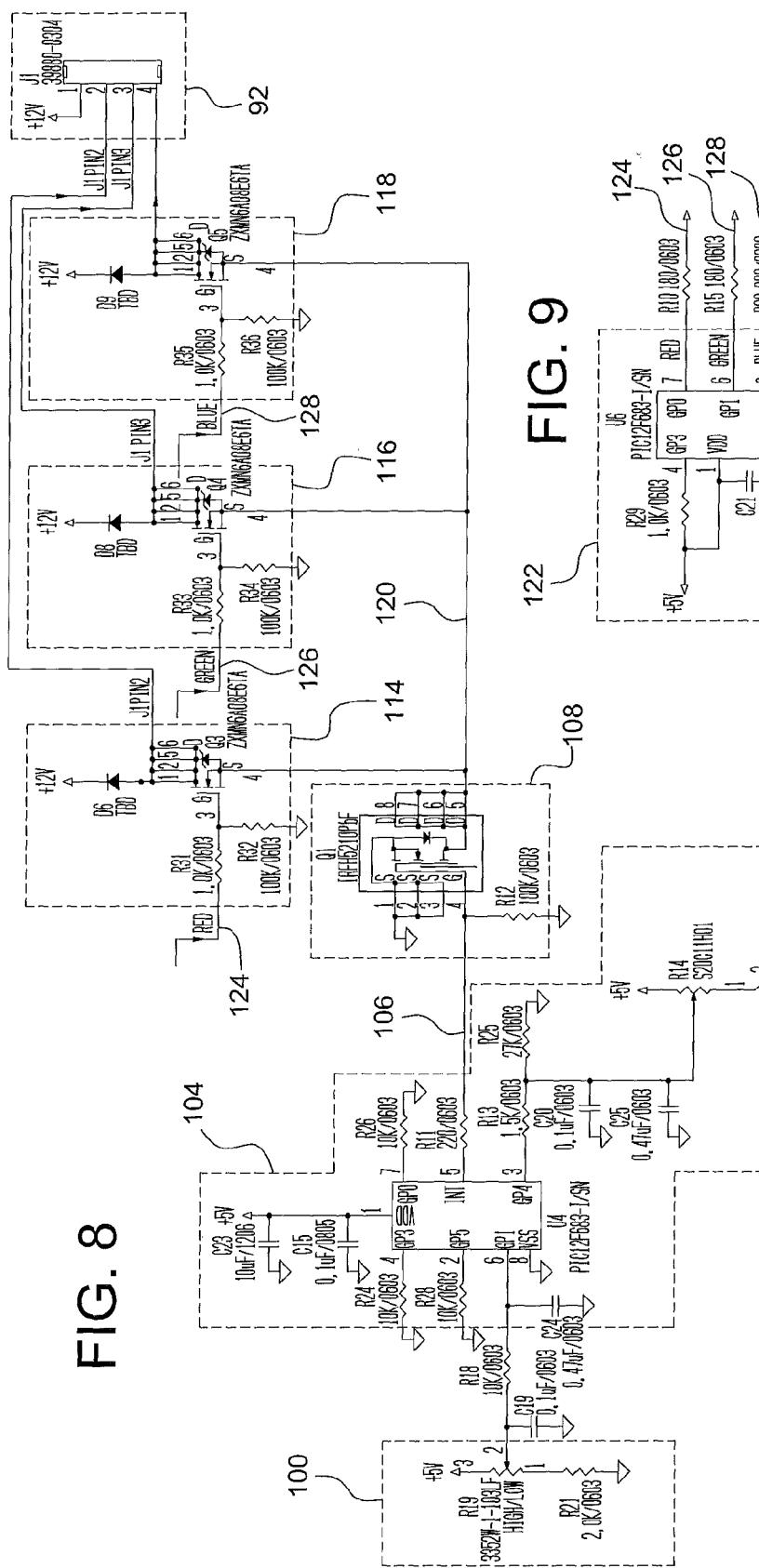
FIG. 8 is a partial schematic circuit diagram for the integrated dimmer control circuit embodiment of FIG. 7.

FIG. 8 illustrates a circuit diagram of an implementation of the invention corresponding to the block diagram of FIG. 7, wherein (apart from control input 100, which corresponds to control input 54 in FIG. 7) similar components are similarly numbered. In this circuit, switch 108 (MOSFET transistor Q1) provides PWM output pulses on line 120 corresponding to the pattern provided by microprocessor 104 to control the duty cycle of individual lamp switches 114, 116 and 118 (MOSFET transistors Q3, Q4 and Q5, respectively), while MOSFETS Q3, Q4 and Q5 are selectively enabled by microprocessor 122 via lines 124, 126, and 128 to control which of the three LEDs 94, 96 and 98 is turned on. In one implementation of the invention, the PWM frequency of Q1 was set to be much higher than that of Q3, Q4 and Q5 to prevent interference, thus avoiding flickering of the LEDs at the load. Basically, this combination works as two sets of switches in series, where the LEDs at the load only get turned on when both inputs to the lamp switch transistors are on. As described above, two microprocessors are used; one to control Q1 by PWM signals, while the other controls the mode or color of the RGB LEDs.

Figure 9:
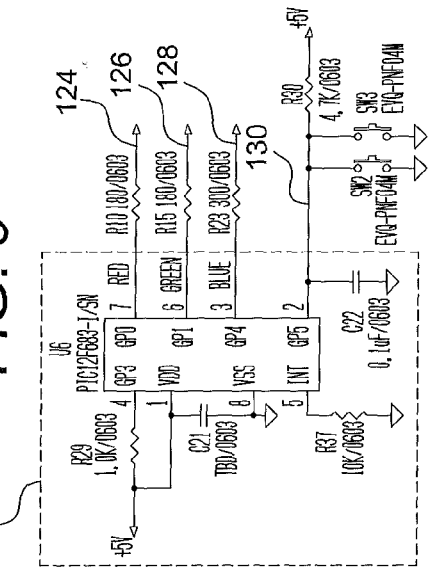
FIG. 9 is a partial circuit diagram for a color selector micro-controller or microprocessor for use with the system of the invention.

As illustrated in FIG. 9, in one embodiment of the invention, RGB LED lamp control signals 124, 126 and 128 are generated by color selector microprocessor or microcontroller 122 and may be provided at the control switch 54, for example at the location of the controller 14 illustrated in FIG. 1, to mimic the RGB LEDs at the load (i.e., the LED lamps being powered and controlled). An RGB indicator lamp (not shown) optionally serves as an indication of proper wiring of the load. If the colors displayed at the load do not match the colors of the internal RGB indicator, then there has been an error in the connection.

Figure 3:
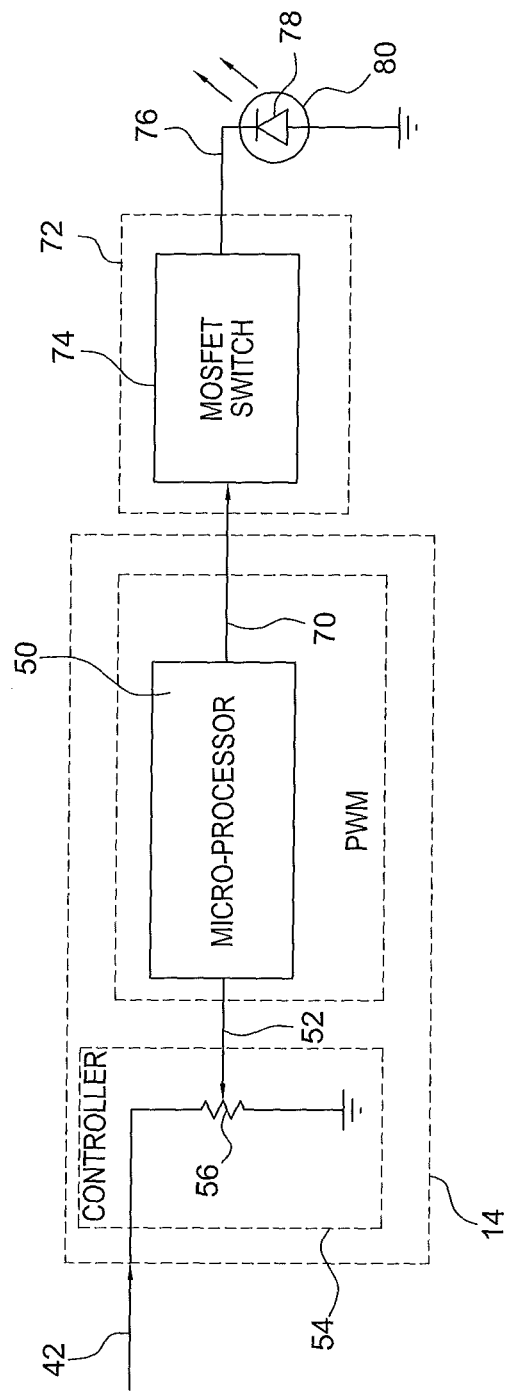
FIG. 3 is a more detailed block diagram of the Pulse Width Modulator (PWM) and Controller of FIG. 1.
Figure 10:
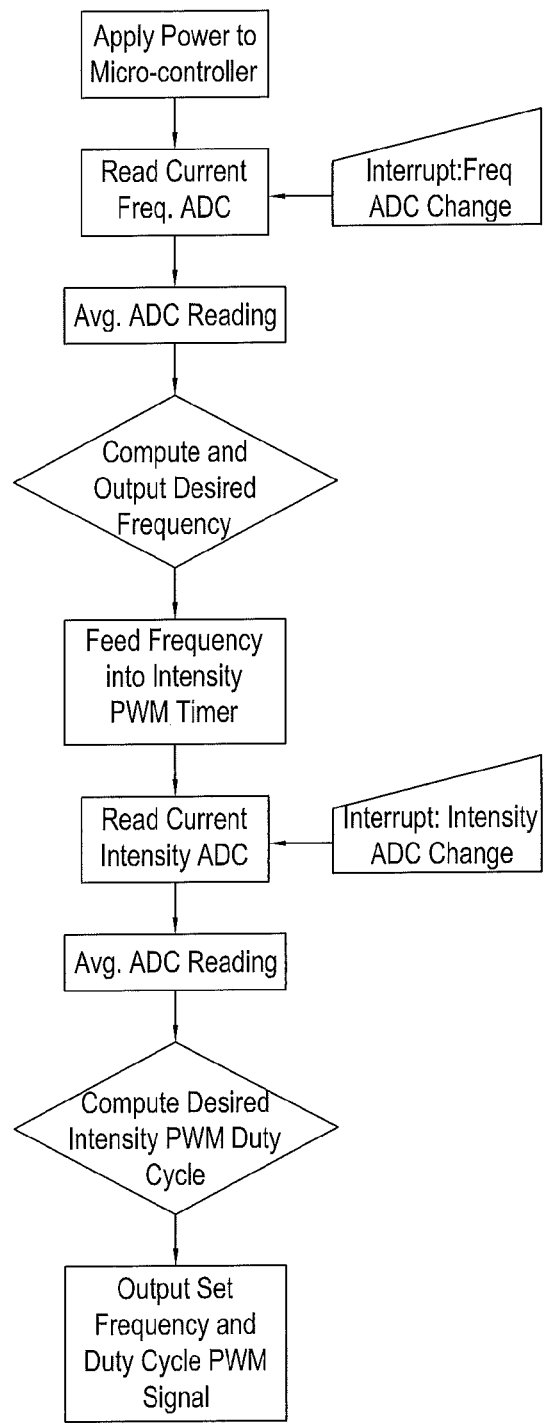
FIG. 10 is a program or software process flow diagram illustrating the method steps executed in the LED intensity control micro-controller of FIG. 7, in accordance with the present invention.

As noted above, the micro controllers (e.g., 14, 104 and 122) are preferably implemented as commercially available integrated circuit such as the PIC12F683 micro controller, as sold commercially, and each is programmed to generate a desired light control signal in response to a sensed control input signal. FIG. 10 is a program or software process flow diagram illustrating the method steps executed in the LED intensity control micro-controller 104 as shown in FIG. 7, and an exemplary method or program is illustrated therein. First, power is applied to microcontroller 104 and a frequency ADC signal is read or sensed from the control input 52; next, the control input signal is averaged and a corresponding desired output frequency signal is computed and generated in response. The desired output frequency signal is input to a PWM timer and an intensity ADC signal is read or sensed and then averaged, whereupon a desired intensity PWM duty cycle is computed and output as signal 106 which is used to control MOSFET switch 108. A similar method or program is used to control the single color integrated dimmer control circuit microcontroller 14 as shown in FIGS. 1 and 3.

Figure 11:
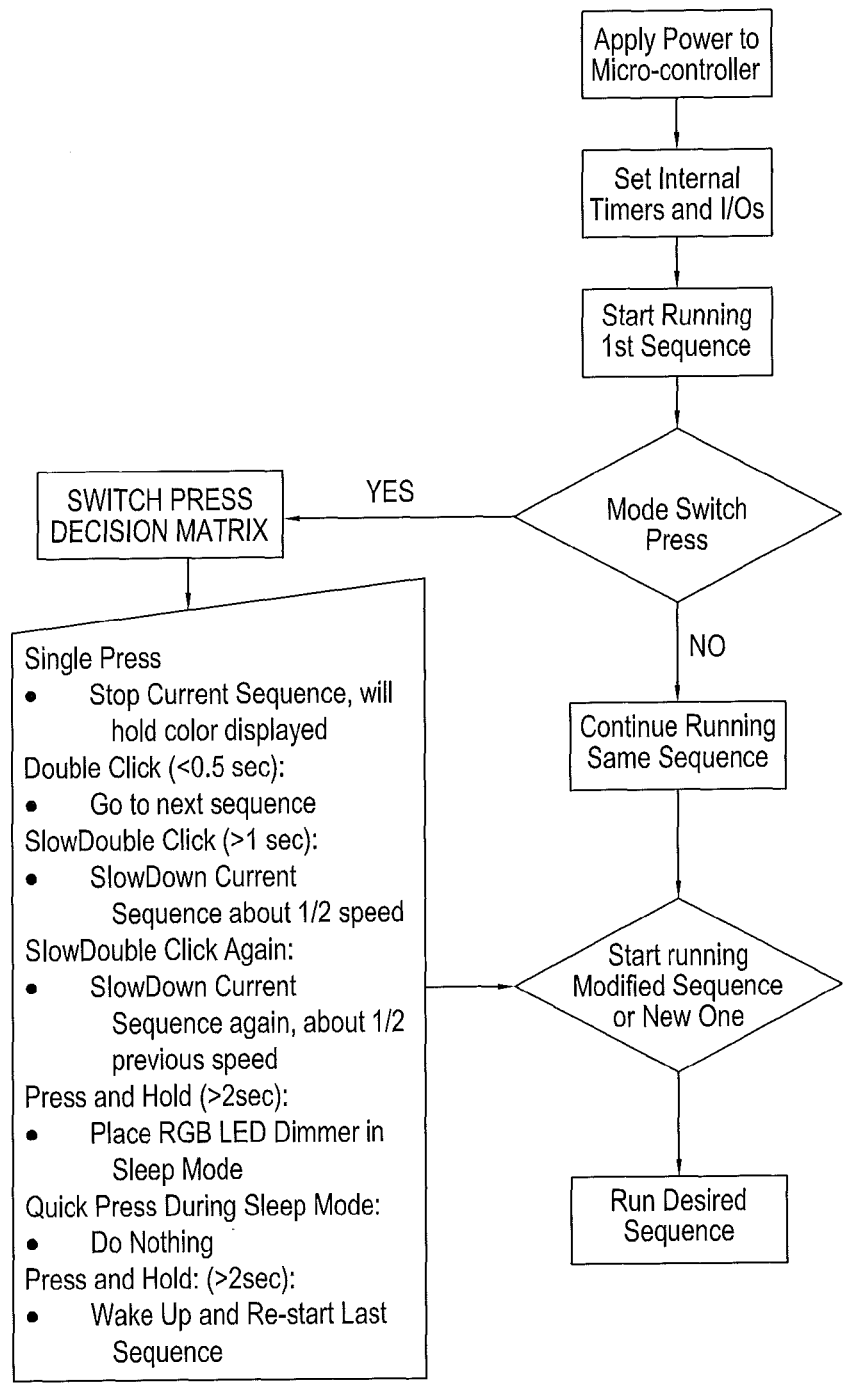
FIG. 11 is a program or software process flow diagram illustrating the method steps executed in the LED RGB color control micro-controller of FIG. 7, in accordance with the present invention.

The RGB color selector micro controller 122 is also preferably implemented as commercially available integrated circuit such as the PIC12F683 micro controller, as sold commercially, and is programmed to generate a plurality of desired light control signals 124, 126 and 128 in response to a sensed control input signal 130. FIG. 11 is a program or software process flow diagram illustrating the method steps executed in the RGB LED color selector control process, and an exemplary method or program is illustrated therein. First, power is applied to microcontroller 122 and internal timers and Input/Output states are set to initial default settings. Next, the mode switch state is sensed, and if sensed, a switch press pattern decision matrix is executed to determine whether the user has performed a single press, a double click, a slow double click, a press & hold or a quick press, and micro-controller 122 is programmed to either alter or continue the illumination control sequences on outputs 124, 126 and 128 to alter the selected color in response to a sensed change indicated by the user.

Figure 12A:
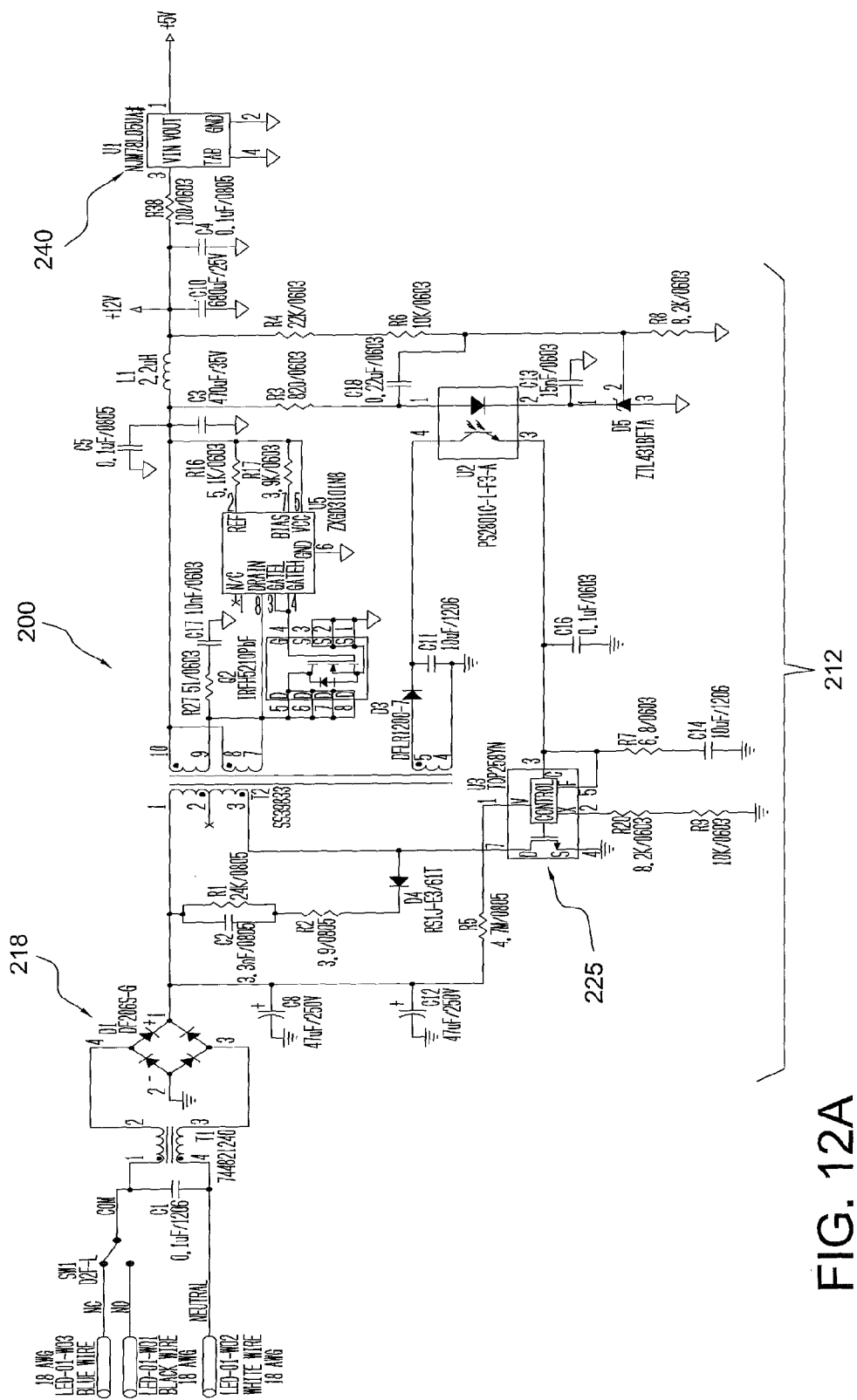
FIGS. 12A and 12B are schematic diagrams illustrating another embodiment of the single color or mono-chrome LED integrated dimmer control circuit, in accordance with the present invention.
Figure 12B:
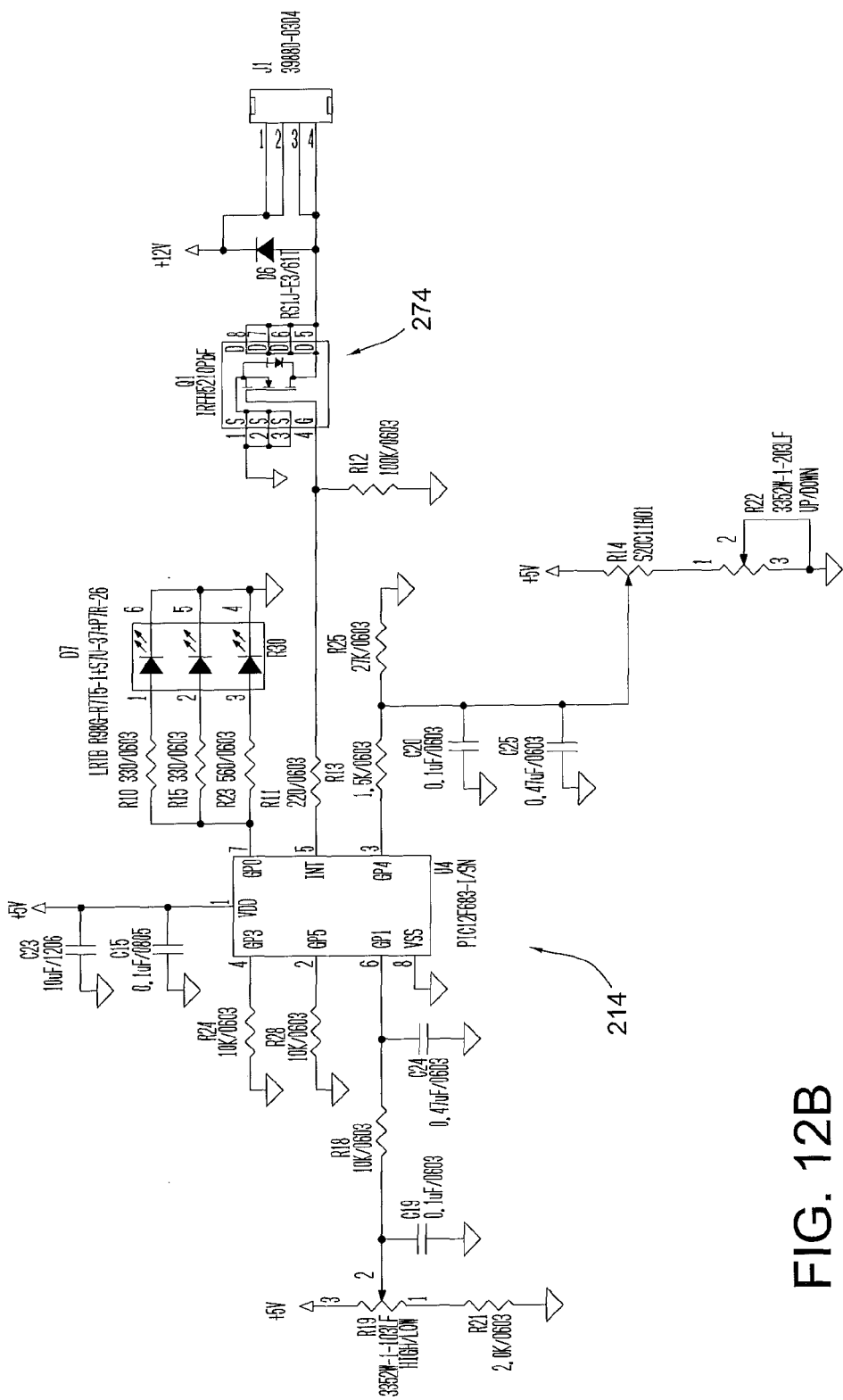

FIGS. 12A and 12B are schematic diagrams illustrating another embodiment 200 of the single color or mono-chrome LED integrated dimmer control circuit, in accordance with the present invention. In principal, the circuit 212 of FIG. 12a functions similarly to circuit 12 in the embodiment of FIG. 1, and the controller and switch elements 214, 274 of FIG. 12B function similarly to circuit 14 and 74 in the embodiment of FIG. 1.

Figure 13A:
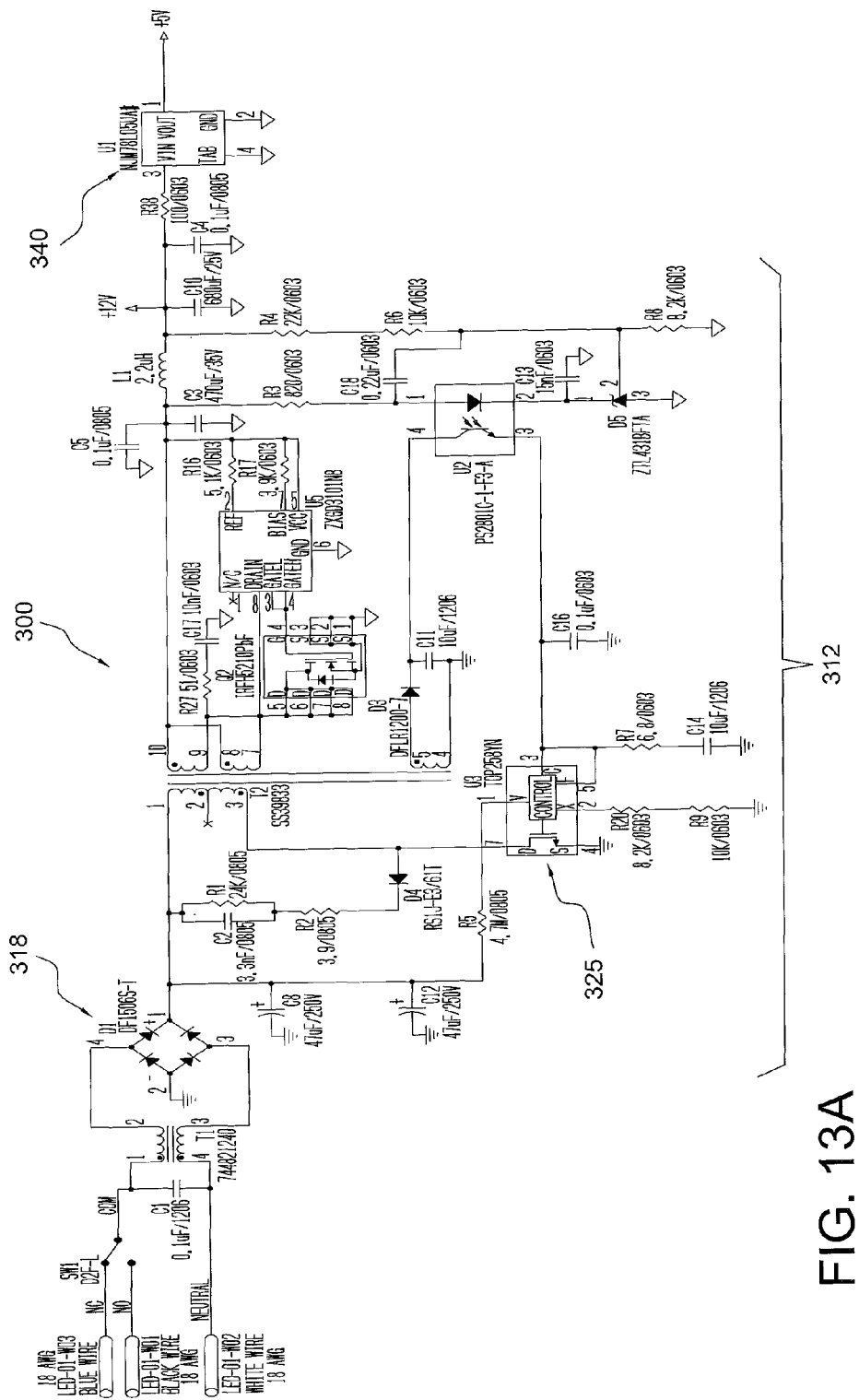

FIGS. 13A, 13B and 13C are schematic diagrams illustrating another embodiment of the RGB illumination color selecting LED integrated dimmer control circuit, in accordance with the present invention. The circuits of FIG. 12A and FIG. 13A are essentially identical, but are identified here with separate reference numbers (e.g., power controller IC 225 is identical to power controller IC 325 and serve the same purpose as power controller IC 25 shown in FIG. 2) because each is entirely integrated into its respective the integrated dimmer control embodiment (e.g., in a PC Board Assembly such as 400). Thus, in principal, the integrated power supply circuit 312 of FIG. 13A functions similarly to circuit 12 in the embodiment of FIG. 1, and the PWM microcontroller and switch elements 304, and 308 of FIG. 13B function similarly to corresponding elements 104 and 108 in the embodiment of FIG. 7. And for RGB color control, the microcontroller 322 of FIG. 13C functions similarly to color selector microcontroller 122 in the embodiment of FIG. 7 and switch elements 314, 316 and 318 of FIG. 13B respond to control signals 324, 326 and 328 and thus function similarly to switch elements 114, 116 and 118 in the embodiment of FIG. 7.

Figure 14:
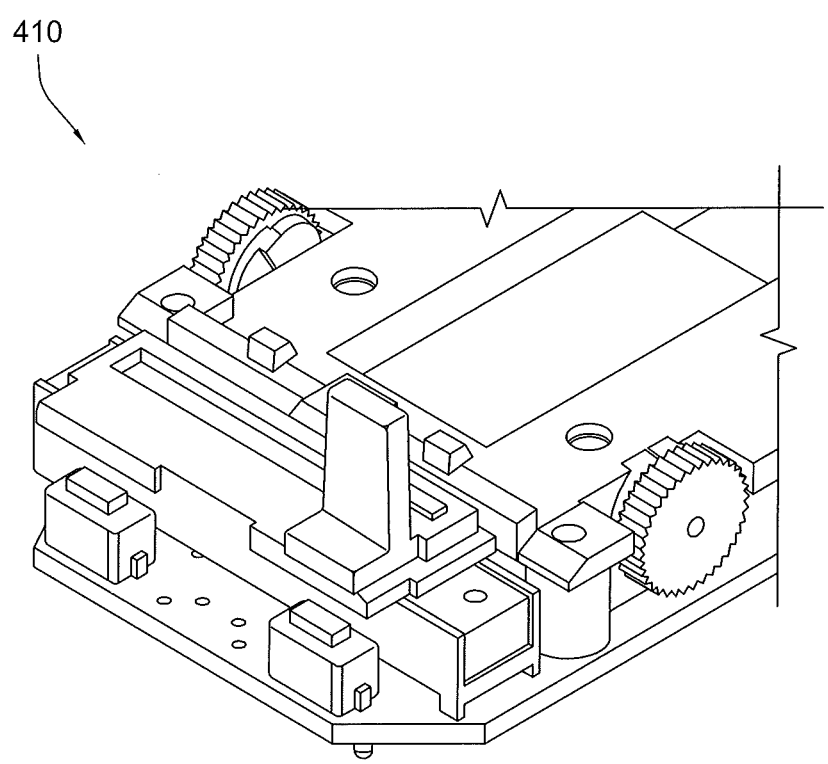
FIG. 14 is a perspective view, in elevation illustrating a portion of the Push button, Slide Potentiometer mechanism of the LED dimmer system of FIGS. 13A, 13B and 13C, in accordance with the present invention.

The circuits of FIGS. 1-13B enable a densely packed Printed Circuit Board ("PCB") assembly 400 to be housed in a single-gang enclosure 450, as shown in FIGS. 14-16B. FIG. 14 is a perspective view, in elevation illustrating a portion of the Push button, Slide Potentiometer mechanism 410 of the LED dimmer system 10 with, preferably the circuits of FIGS. 13A, 13B and 13C, in accordance with the present invention. FIGS. 15A and 15B are top and bottom plan views of the LED controller Printed Circuit Board Assembly 400 with placement of the integrated dimmer control circuit's electronic components as illustrated in schematic FIGS. 13A-13C, in accordance with the present invention.

Thus, individual lamp switches 314, 316, and 318, each require two inputs to energize their corresponding lamps, so each lamp switch is further controlled by a second input provided by a second, color selector, microprocessor 322 by way of red, green and blue control signals on lines 324, 326, and 328, respectively. Microprocessor 322 is programmed (e.g., as shown in the RGB program flow chart of FIG. 11) to respond to an input signal on line 330 and produce output signals patterned to select, or enable, which of the multiple lamps will be activated by the PWM output from microprocessor 304. Accordingly, the outputs from the two microprocessors 304 and 322 cooperate to control the brightness of the light produced by each LED in a lamp assembly (e.g., such as 92, shown in FIG. 7, and connected via connector J1 or 392, as shown in FIG. 13B) that is enabled to thereby generate a desired blended RGB light output by generating distinct R, G and B outputs.

Figure 15B:
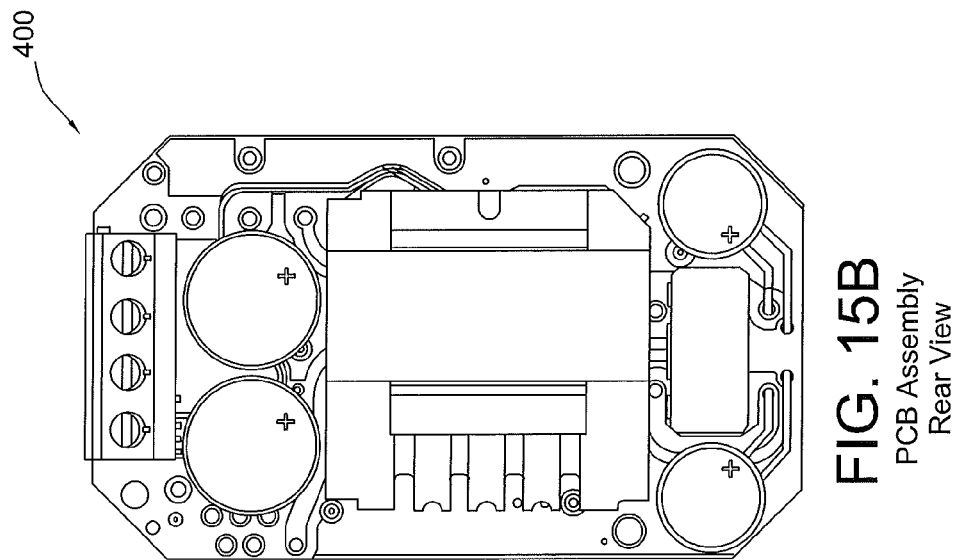
FIGS. 15A and 15B are top and bottom plan views of the LED controller Printed Circuit Board Assembly with placement of the integrated dimmer control circuit's electronic components as illustrated in schematic FIGS. 13A-13C, in accordance with the present invention.
Figure 15A:
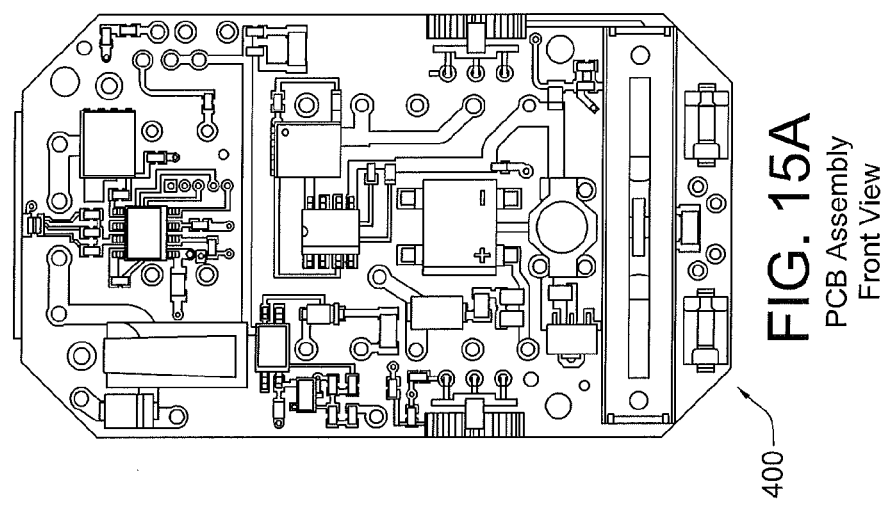
Figure 16B:
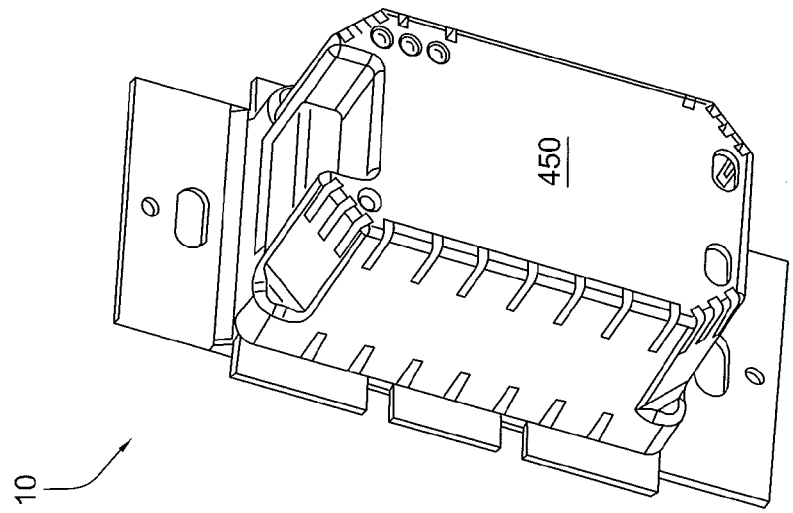
FIGS. 16A and 16B are front and rear perspective views of a single-gang enclosure embodiment of the LED controller Assembly of FIGS. 15A and 15B, in accordance with the present invention.
Figure 16A:
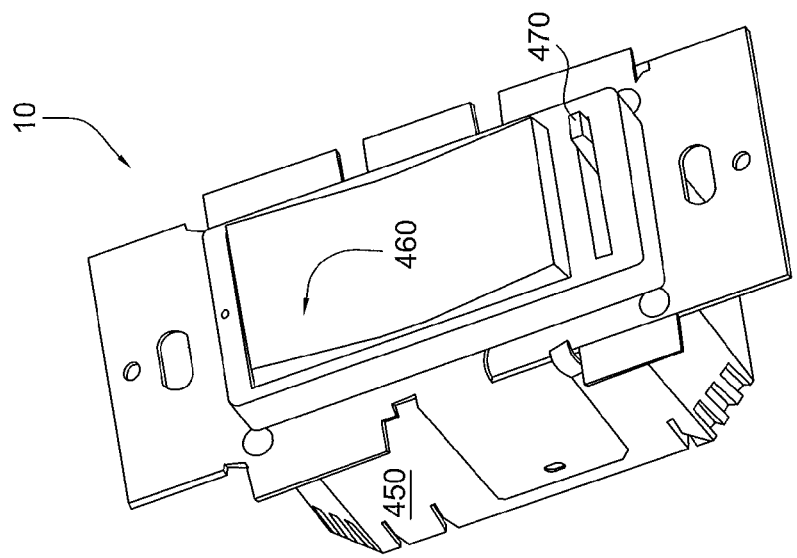

FIGS. 16A and 16B are front and rear perspective views of a single-gang enclosure 450 containing the LED controller Assembly 400 of FIGS. 15A and 15B, illustrating how a rocker control switch 460 and a front facing slide control potentiometer 470 are accessible from the front of the enclosure when the enclosure is mounted within a wall or behind a bezel or switch plate assembly as are commonly used when electrical switch or lighting controls are installed by electricians in residential, commercial or industrial settings.

The circuit and dimmer controller structure of the present invention provides a significant advantage over the prior art because it integrates the DC power supply into the casing of a standard single or dual gang housing together with the necessary dimming circuitry for the LED lights.

Advantages of incorporating Dimming Circuitry and Power Supply into one fixture and assembly in the configuration of the present invention include:

Reduced parts count, for economy and enhanced reliability;

Simplified and less labor intensive installation;

Lower cost to the user;

Reduced space required;

Can be used for Low Voltage LED and Incandescent Loads without the need of an external magnetic or electronic transformer;

Can be used with 12VDC or 24VDC LED and Incandescent light fixtures;

High energy conversion efficiency;

Extended dimming range from about 0% to 100%;

Useable as a 0-10V dimming control for many of today's Compact Fluorescent Lamps ("CFLs", e.g., thus providing dimmable ballast) and Linear Fluorescent lamps.

In accordance with the present invention, therefore, a low voltage dimmer for controlling LED lamps incorporates an AC-DC power supply inside the form factor of a standard single (or dual) gang dimmer housing, and uses either Pulse Width Modulation pulse frequency control to modify the power delivered to the load, thus controlling the light intensity from the LED (or load). In the exemplary embodiments described above, the dimmer circuit is configured with a microprocessor to modulate the output duty cycle to the load; however, it will be understood that this could be done using analog electronics.

It will be appreciated by those of skill in the art that the present invention 10 makes a pulse signal controlled illumination source available which can generally be characterized as including a self contained, integrated LED illumination dimmer control circuit and assembly 10 configured for use in a single gang housing or similar small enclosure 450 for use in controlling and energizing one or more LED solid state lamps, comprising: a dimmer controller printed circuit board assembly (e.g., 400) including an AC-DC power conversion circuit for providing a selectable control voltage; a pulsed control circuit connected to said LED lamp, said pulsed control circuit being responsive to said control voltage to produce output pulses corresponding to said selectable control voltage to modify the power delivered to the LED lamp and to thereby control the intensity of the light emitted by the LED lamp, for either monochrome (e.g., white) LED lamps or, optionally for multi-color (e.g., RGB) lamp assemblies. The dimmer control pulsed control circuit may include a micro-controller (e.g., 14 or 214) to modulate the duty cycle of said output pulses to drive said LED lamp to switch said LED lamp between "on" and "off" conditions to regulate the total amount of time in each cycle of output power that the LED lamp is illuminated and to thereby control the intensity of the light produced by said LED lamp. The dimmer control circuit of FIGS. 13A-13C can control and energize or dim an LED or solid state lamp having a selected color component such as Red, Green or Blue, and the pulsed control circuit includes a micro-controller (e.g., 122 or 322) to modulate the duty cycle of said output pulses to drive said selected color LED lamp to switch said LED lamp between "on" and "off" conditions to regulate the total amount of time in each cycle of output power that the LED lamp is illuminated and to thereby control the color and intensity of the light produced by a lamp assembly including said selected color (e.g., R, G or B) LED lamp.

Having described preferred embodiments of a new and improved circuit, apparatus and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A simple to use dimming control for a Low Voltage LED lamp configured to fit within a conventional single-gang electrical receptacle, comprising: at least one low-voltage LED lamp;
   a dimmer controller for connection to an AC-DC power supply for providing a selectable DC control voltage; a Pulse Width Modulator (PWM) connected to said LED lamp, said PWM being responsive to said DC control voltage to produce output pulses having widths corresponding to said selectable DC control voltage to modify the power delivered to the LED lamp and to thereby control the intensity of the light emitted by the LED lamp;
   wherein said PWM includes a micro-controller to modulate the duty cycle of said output pulses to drive said LED lamp to switch it between "on" and "off" conditions to regulate the total amount of time in each cycle of output power that the lamp is illuminated and to thereby control the intensity of the light produced by said LED lamp;
   wherein said micro-controller is connected to said LED lamp through a switch;
   wherein said LED lamp is a multicolor lamp having multiple sets of LEDs; and said micro-controller is connected to each set of LEDs through a corresponding switch to control the intensity of the light produced by each set of LEDs; and
   further including a second micro-circuit connected through said corresponding switches to individually control each of said LED sets to select which set or sets can be activated by said first-named micro-processor.

2. A simple to use dimming control for a Low Voltage LED lamp configured to fit within a conventional single-gang electrical receptacle, comprising
   at least one low-voltage LED lamp;
   a dimmer controller for connection to an AC-DC power supply for providing a selectable DC control voltage;
   a Pulse Width Modulator (PWM) connected to said LED lamp, said PWM being responsive to said DC control voltage to produce output pulses having widths corresponding to said selectable DC control voltage to modify the power delivered to the LED lamp and to thereby control the intensity of the light emitted by the LED lamp;
   wherein said PWM includes a micro-controller to modulate the duty cycle of said output pulses to drive said LED lamp to switch it between "on" and "off" conditions to regulate the total amount of time in each cycle of output power that the lamp is illuminated and to thereby control the intensity of the light produced by said LED lamp;
   wherein said micro-controller is connected to said LED lamp through a switch;
   wherein said LED lamp is a multicolor lamp having multiple sets of LEDs; and said micro-controller is connected to each set of LEDs through a corresponding switch to control the intensity of the light produced by each set of LEDs;
   further including a second micro-circuit connected through said corresponding switches to individually control each of said LED sets to select which set or sets can be activated by said first-named micro-processor; and
   wherein said multiple sets of LEDs in said LED lamp includes a Red, a Green and a Blue set.

3. A simple to use dimming control for a Low Voltage LED lamp configured to fit within a conventional single-gang electrical receptacle, comprising
   at least one low-voltage LED lamp;
   a dimmer controller for connection to an AC-DC power supply for providing a selectable DC control voltage;
   a Pulse Width Modulator (PWM) connected to said LED lamp, said PWM being responsive to said DC control voltage to produce output pulses having widths corresponding to said selectable DC control voltage to modify the power delivered to the LED lamp and to thereby control the intensity of the light emitted by the LED lamp;
   wherein said PWM includes a micro-controller to modulate the duty cycle of said output pulses to drive said LED lamp to switch it between "on" and "off" conditions to regulate the total amount of time in each cycle of output power that the lamp is illuminated and to thereby control the intensity of the light produced by said LED lamp;
   wherein said micro-controller is connected to said LED lamp through a switch;
   wherein said LED lamp is a multicolor lamp having multiple sets of LEDs; and said micro-controller is connected to each set of LEDs through a corresponding switch to control the intensity of the light produced by each set of LEDs;
   further including a second micro-circuit connected through said corresponding switches to individually control each of said LED sets to select which set or sets can be activated by said first-named micro-processor;
   wherein said multiple sets of LEDs in said LED lamp includes a Red, a Green and a Blue set; and
   wherein said AC-DC power supply is a Switch Mode Power Supply (SMPS) which converts an AC input to a low voltage, rectified, filtered and galvanically isolated DC voltage.

4. A simple to use dimming control for a Low Voltage LED lamp configured to fit within a conventional single-gang electrical receptacle, comprising
   at least one low-voltage LED lamp;
   a dimmer controller for connection to an AC-DC power supply for providing a selectable DC control voltage;
   a Pulse Width Modulator (PWM) connected to said LED lamp, said PWM being responsive to said DC control voltage to produce output pulses having widths corresponding to said selectable DC control voltage to modify the power delivered to the LED lamp and to thereby control the intensity of the light emitted by the LED lamp;
   wherein said PWM includes a micro-controller to modulate the duty cycle of said output pulses to drive said LED lamp to switch it between "on" and "off" conditions to regulate the total amount of time in each cycle of output power that the lamp is illuminated and to thereby control the intensity of the light produced by said LED lamp;

wherein said micro-controller is connected to said LED lamp through a switch;

wherein said LED lamp is a multicolor lamp having multiple sets of LEDs; and said micro-controller is connected to each set of LEDs through a corresponding switch to control the intensity of the light produced by each set of LEDs;

further including a second micro-circuit connected through said corresponding switches to individually control each of said LED sets to select which set or sets can be activated by said first-named micro-processor;

wherein said multiple sets of LEDs in said LED lamp includes a Red, a Green and a Blue set;

wherein said AC-DC power supply is a Switch Mode Power Supply (SMPS) which converts an AC input to a low voltage, rectified, filtered and galvanically isolated DC voltage;

and wherein said dimmer controller is a variable resistor.

5. A simple to use dimming control for a Low Voltage LED lamp, comprising:

a Printed Circuit Board (PCB) assembly configured to fit within a conventional single-gang electrical receptacle and including at least one low-voltage LED lamp;

said PCB assembly also including a dimmer controller for connection to an AC-DC power supply for providing a selectable DC control voltage;

a Pulse Width Modulator (PWM) connected to said LED lamp, said PWM being responsive to said DC control voltage to produce output pulses having widths corresponding to said selectable DC control voltage to modify the power delivered to the LED lamp and to thereby control the intensity of the light emitted by the LED lamp;

wherein said PWM includes a micro-controller to modulate the duty cycle of said output pulses to drive said LED lamp to switch it between "on" and "off" conditions to regulate the total amount of time in each cycle of output power that the lamp is illuminated and to thereby control the intensity of the light produced by said LED lamp;

wherein said micro-controller is connected to said LED lamp through a switch;

and wherein said LED lamp is a multicolor lamp having multiple sets of LEDs; and said micro-controller is connected to each set of LEDs through a corresponding switch to control the intensity of the light produced by each set of LEDs;

further including a second micro-circuit connected through said corresponding switches to individually control each of said LED sets to select which set or sets can be activated by said first-named micro-processor.

6. The dimming set of claim 5, wherein said multiple sets of LEDs in said LED lamp includes a Red, a Green and a Blue set.

7. The dimming control of claim 6, wherein said AC-DC power supply is a Switch Mode Power Supply (SMPS) which converts an AC input to a low voltage, rectified, filtered and galvanically isolated DC voltage.

8. The dimming control of claim 7, wherein said dimmer controller is a variable resistor.

* * * * *